Nov. 8, 1932.  C. R. DAVIS  1,887,346
CHAIN LIFTER FOR IMPLEMENTS
Filed Oct. 9, 1931
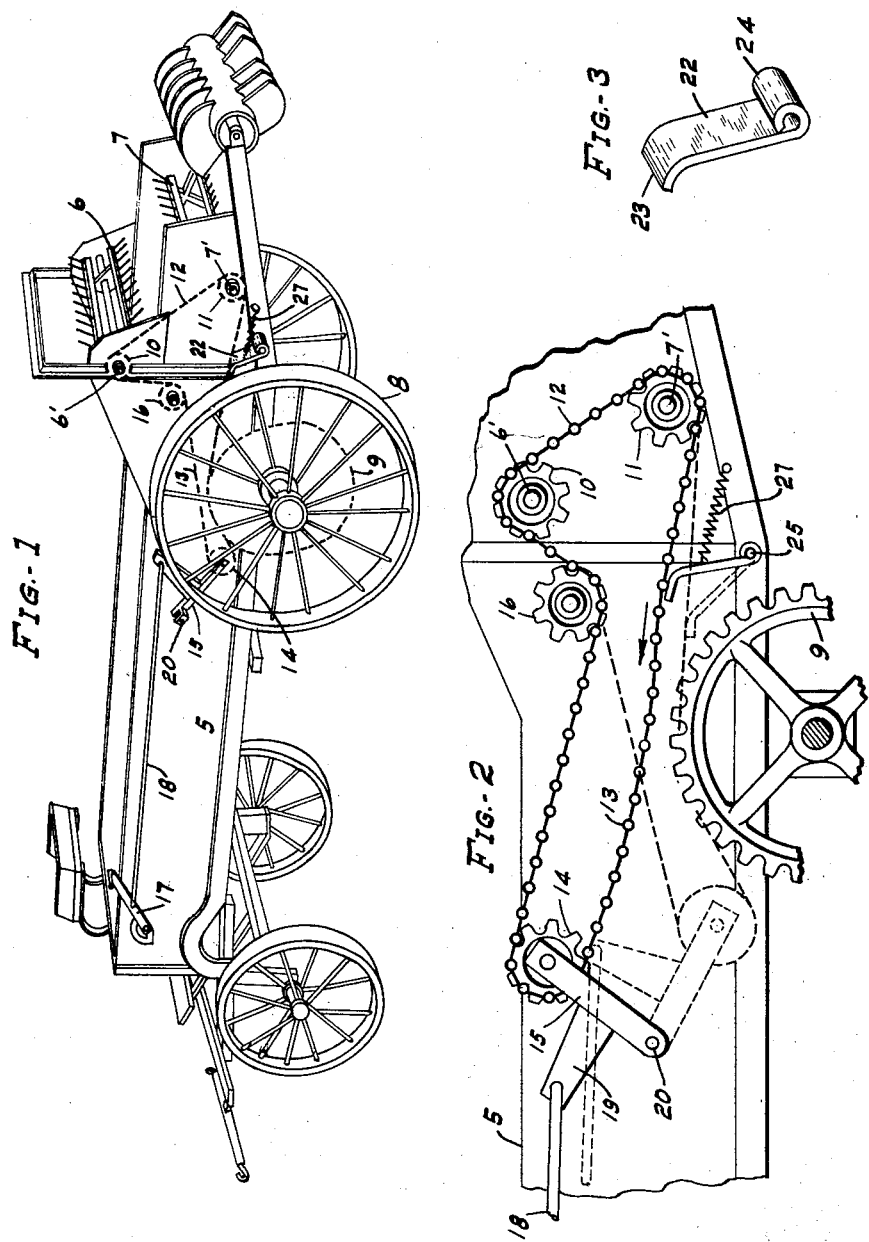
INVENTOR.
CALVIN R. DAVIS
BY James A. Walsh
ATTORNEY Patented Nov. 8, 1932

1,887,346

UNITED STATES PATENT OFFICE

CALVIN R. DAVIS, OF ROCKFORD, ILLINOIS, ASSIGNOR TO J. I. CASE COMPANY, OF RACINE, WISCONSIN, A CORPORATION

CHAIN LIFTER FOR IMPLEMENTS

Application filed October 9, 1931. Serial No. 567,836.

My invention relates to agricultural implements and the like employing sprocket chains, such as manure spreaders, the driving chains of which under some conditions, as when released from a sprocket, become loose and sagged and accidently reengaged with its driving sprocket, thus causing breakage or impairment of parts of the implement or machine, and it is my object to provide simple and effective means for obviating such difficulties.

In the accompanying drawing I have illustrated my improvement as applied to a manure spreader, Figure 1 being a perspective of such a vehicle and showing the driving sprocket and chain in engagement; Fig. 2, an enlarged detail showing the chain disengaged from the sprocket and raised in relation thereto, the operating position of the chain being indicated by dotted lines and its inoperative position by full lines; and Fig. 3 is a perspective of the chain lifter which I employ.

In said drawing the numeral 5 indicates a manure spreader having rotatable elements such as the cylinders 6 and 7 driven by a wheel 8 including a sprocket 9. The shafts 6' and 7' of the cylinders are provided with sprockets 10 and 11 about which a drive chain 12 is applied, the lower run 13 of which chain engages the teeth at the upper side of sprocket 9, thence is turned about an idler 14 on a lever 15, and may be further held in position by a tightener sprocket 16 as indicated in the drawing.

In Fig. 1 the chain 12 is indicated as engaging sprocket 9 and in proper position to actuate cylinders 6, 7, such relation being accomplished by manipulating a lever 17 having a rod 18 connected thereto, and to the lever 15, preferably through an arm 19 extending therefrom, which lever in turn is pivotally connected to the vehicle at 20. On the vehicle 5 I mount a chain lifter, Fig. 3, comprising a plate 22 having a lip 23 extending from its upper end and a bearing 24 at its lower end for pivotally connecting the lifter, as at 25, to the vehicle, and which lifter is yieldingly mounted thereon by means of an extension spring 27. When in engagement with sprocket 9 the lower run 13 of chain 12 contacts with the lifter, urging it toward the sprocket, and rides upon and is supported by the lip 23 as shown in Fig. 1, but when it becomes necessary to discontinue rotation of the cylinders the lever 17 is reversed, which movement, through the rod 18, pulls the lever 15 into the position shown in full lines in Fig. 2, whereupon chain 13 will be raised and released from engagement with sprocket 9, upon which occurrence the chain lifter 22 through the action of spring 27 will be drawn to the vertical position shown in full lines in Fig. 2, during which movement the lip 23 will lift and then maintain the chain from unduly sagging and contacting with said sprocket. In this manner the lower run of the chain is sustained in alignment with the teeth of sprocket 9 so that upon reversal of lever 17 the lever 15 will be actuated to lower the chain into engagement with said sprocket teeth, as indicated in dotted lines in Fig. 2, in condition for rotating the cylinders 6 and 7, and during which lowering movement said chain will engage lifter 22 and force the same downwardly to the position indicated in dotted lines in Fig. 2. By thus providing means for lifting the chain from engagement with the driving sprocket the chain will be prevented from engaging said sprocket and rotating the cylinders while the vehicle is being drawn over ground inequalities and subjected to considerable jolting, and therefore damage to rotatable parts normally actuated by the chain is avoided.

I claim as my invention:

1. The combination with a sprocket-and-chain system, of a chain lifter comprising a member having a lip at its free end thereon for supporting a chain, means for pivotally connecting said member to an implement and the like, and a yielding means connecting the member to an implement for swinging the member upwardly to disengage a chain from a sprocket and whereby said chain will be supported and maintained in disengagement with said sprocket.

2. The combination, with a sprocket-and-chain system, of a chain lifter, means for pivotally securing the lifter to a supporting element to rock in the direction of travel of a chain contacting therewith and in engagement with a sprocket, and yielding means connecting the lifter to a support for automatically rocking the lifter in the opposite direction to raise and maintain the chain from engagement with the sprocket.

3. The combination, with a sprocket-and-chain system, of a chain lifter pivotally secured to a supporting means, said lifter having a lip for engaging a chain to position the latter on a sprocket, and yielding means for automatically reversing the direction of motion of the lifter to maintain the chain from engagement with a sprocket.

4. A lifter for sprocket chains having a bearing at its lower end for pivotally connecting the same to a support, means at its upper end for contact with and maintaining a chain from engagement with a sprocket, and a spring connected to a support and to said lifter for automatically positioning the lifter to contact and maintain the chain for the purpose stated.

5. A chain lifter for sprocket chains having a bearing at its lower end for pivotally connecting the same to a support and upon which lifter a chain in engagement with a sprocket will ride, and yielding means for automatically actuating the lifter to raise and maintain said chain from engagement with a sprocket when said chain has been disengaged therefrom.

In testimony whereof I affix my signature.

CALVIN R. DAVIS.